Jan. 1, 1963  D. E. MACPHERSON  3,071,121
ROTARY PISTON ENGINE

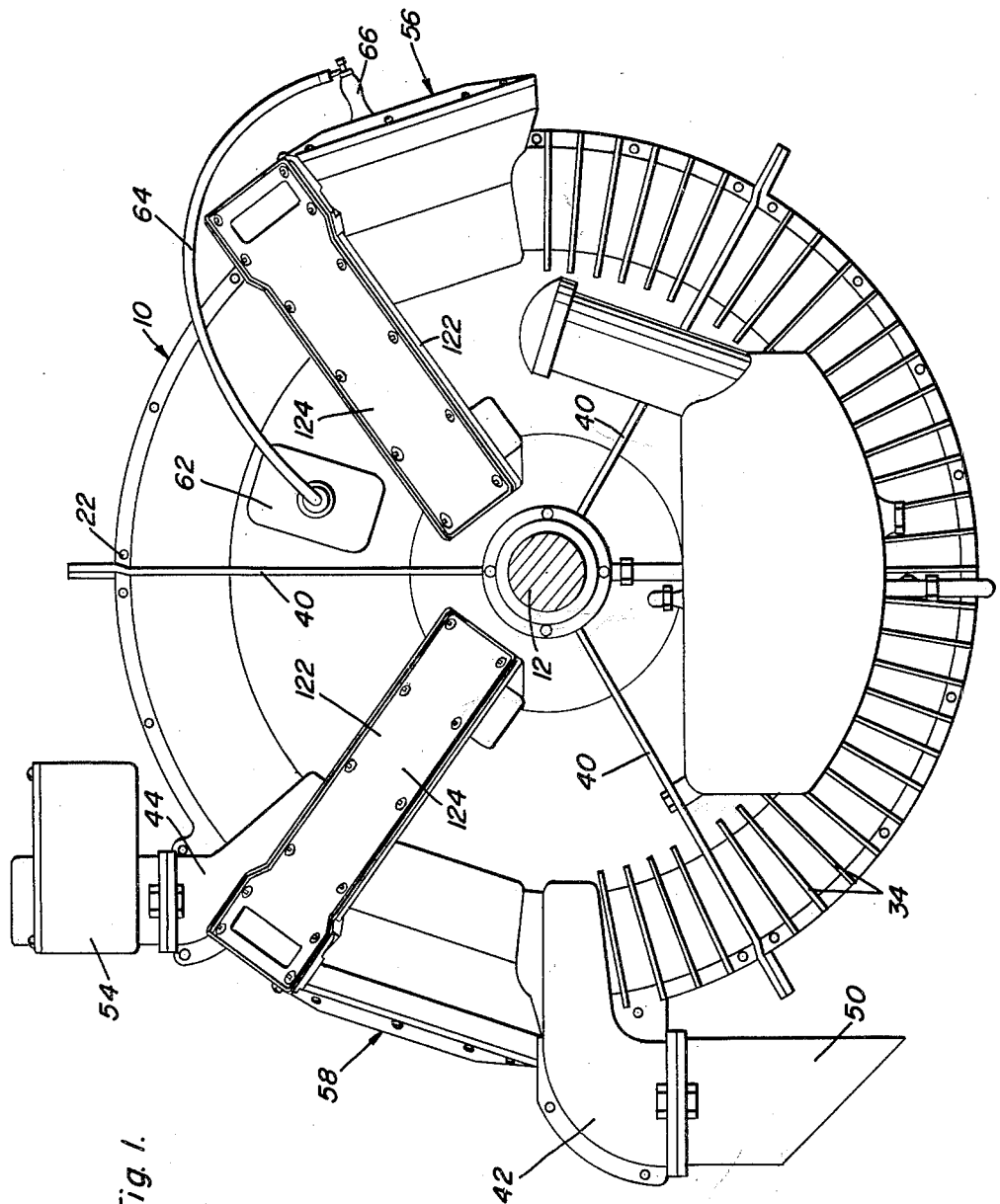

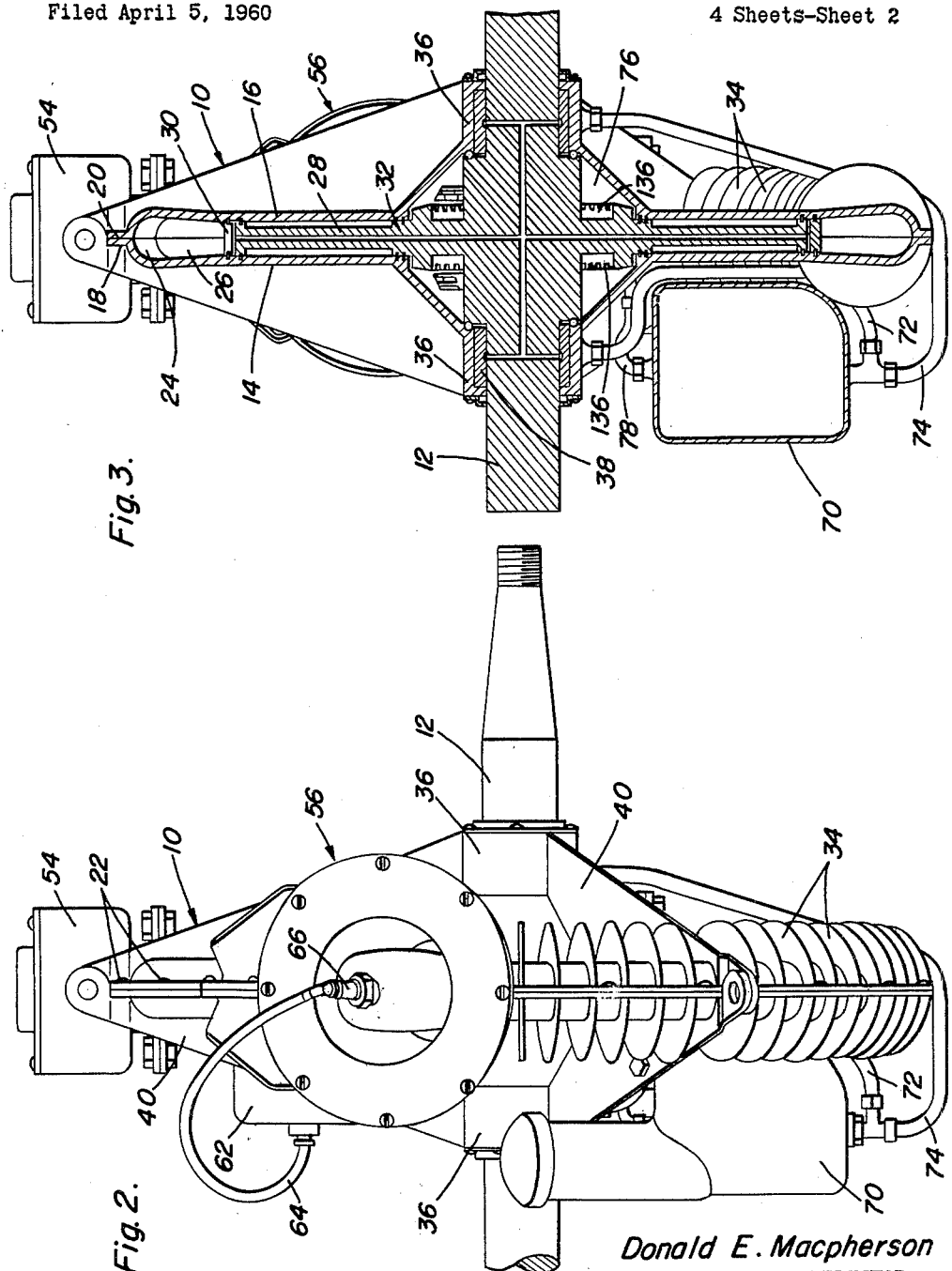

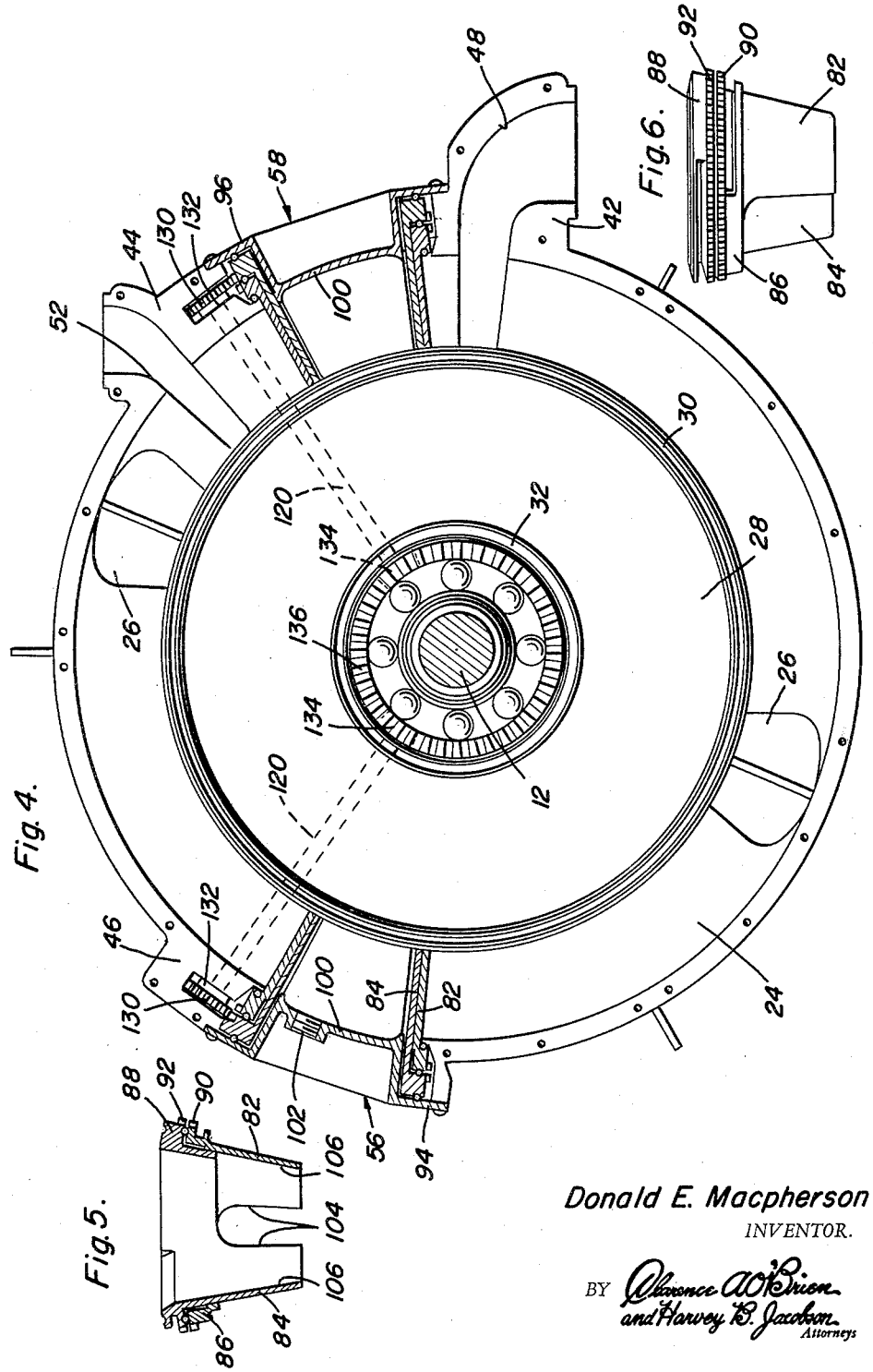

Filed April 5, 1960  4 Sheets-Sheet 4

Donald E. Macpherson
INVENTOR.

BY *Clarence A. O'Brien*
*and Harvey B. Jacobson*
Attorneys

United States Patent Office 3,071,121
Patented Jan. 1, 1963

3,071,121
ROTARY PISTON ENGINE
Donald E. Macpherson, Salt Lake City, Utah, assignor of one-fourth to Gadget-Of-The-Month Club, Inc., North Hollywood, Calif., a corporation of California
Filed Apr. 5, 1960, Ser. No. 20,210
11 Claims. (Cl. 123—13)

This invention comprises a novel and useful rotary piston engine and more particularly relates to an engine having a toroidal shaped combustion chamber in which a set of pistons rotate continuously at a uniform speed in performing their cycle of operation.

A primary object of this invention is to provide an internal combustion engine having a greatly superior construction, together with advantageous and improved operating characteristics.

An important object of the invention is to provide an internal combustion engine in which there shall be provided a more efficient manner of feeding the fuel to the combustion chamber of the engine by eliminating all reversals of fuel flow in the engine.

A further object of the invention is to provide an internal combustion engine having the characteristic that the power from the exploding and expanding fuel mixture shall be applied continuously to the power shaft of the engine through a considerably greater degree or angle of rotation of the engine shaft than in the conventional reciprocating piston type of engine.

Still another object of the invention is to provide an engine which will enable a complete elemination of all reciprocatory elements and vibrations developed thereby through the substitution of a continuous rotary movement of the pistons and shaft of the engine and the connecting means therebetween.

Yet another object of the invention is to provide an internal combustion engine in which the radiation of heat therefrom may be emitted from a considerably greater area than usual thereby effecting a superior cooling of the engine.

Yet another object of the invention is to provide an internal combustion engine in which the volumetric efficiency of the engine cylinders is improved in elimination of the restriction usually placed upo nthe movement of fuel of tubes and passages of restricted diameter as in the customary engine.

Yet another object of the invention is to provide an internal combustion engine in accordance with the preceding objects wherein the power unit of the engine is well adapted for mounting in multiple units upon the same shaft for increasing the power of the assembly with the same frontal area.

More specifically, it is the purpose of this engine to greatly simplify and improve the operation of an internal combustion engine of the type having a piston which rotates continuously in a toroidal chamber through the provision of a valve assembly which forms the cylinder head of the engine and which is of a rotary character and is so timed that the piston is enabled to pass through the same without substantial loss of pressure or power.

A further important object of the invention is to provide an internal combustion engine of the type set forth in the preceding object in which there is provided a fuel transfer passage in the valve assembly which transfers the fuel compressed ahead of the piston into a combustion chamber and explodes it behind the piston as the latter passes through the valve assembly.

An important subordinate object of the invention is to provide in an internal combustion engine of the character set forth in the preceding objects an improved mechanism for operating the valve assembly.

Still another very important object of the invention is to provide an internal combustion engine in accordance with the preceding objects which shall operate upon the Otto cycle type and shall require no particular or specialized system and construction for its bearings, lubricating means, cooling system, carburetion, ignition or power take-off.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in rear elevation of an internal combustion engine in accordance with the principles of this invention, the power shaft being shown in vertical section therein;

FIGURE 2 is a side elevational view of the apparatus as taken from the right side of FIGURE 1, with a portion of the left end of a power shaft being broken away;

FIGURE 3 is a vertical transverse sectional view of the engine of FIGURE 2 as taken on a vertical plane through the axis of the power shaft of the engine;

FIGURE 4 is a view in vertical transverse section through the engine of FIGURE 1 but taken upon a vertical plane through the plane of junction of the two complemental halves of the engine casing, parts being shown in vertical section therein, and with certain accessories and parts of the engine being omitted therefrom;

FIGURE 5 is a detailed view in vertical section through two of the components of the transfer valve assembly of the invention;

FIGURE 6 is a perspective view of both components of the transfer valve assembly but removed from the engine.

Figure 9:
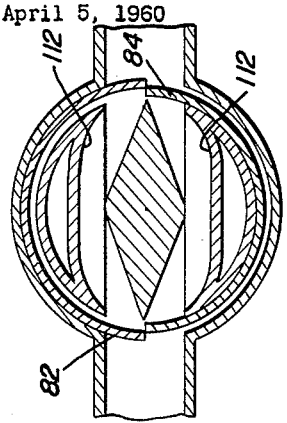
FIGURES 7–12 are views somewhat diagrammatic and taken in horizontal section and showing the sequential steps in the operation of the transverse valve assembly with the rotary piston passing therethrough.
Figure 8:
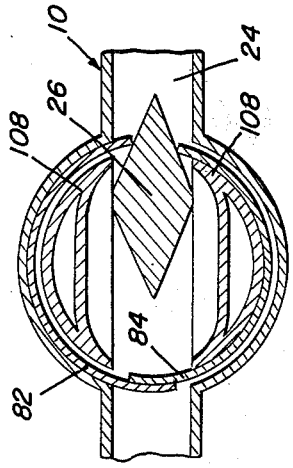

An internal combustion engine exemplifying one suitable manner of carrying out the principles of this invention has been illustrated in the drawings, and consists of an engine casing indicated generally by the numeral 10 which as shown in FIGURES 1 and 4 is generally circular or toroidal. Any desired means are provided for mounting the engine casing in such a manner that the axis of the toroidal casing is disposed horizontally, with all of the components of the engine being positioned about this axis.

As shown in FIGURES 2 and 3 the casing 10 is relatively narrow adjacent its periphery, and relatively wide at its center and a power shaft 12 is disposed axially through this casing and is journalled thereby by any suitable bearing or journal means, whose construction in itself is not essential to the purpose of this invention and therefore need not be considered in detail herein.

For convenience, the casing of the engine 10 consists of two complementary casing sections or halves as at 14 and 16 which are detachably connected together by peripheral flanges 18 and 20 together with suitable fastening bolts 22.

Formed between the complementary peripheral portions of the casing sections 14 and 16 is a ring-shaped or toroidal chamber 24, see in particular FIGURE 4, in which are mounted for rotation thereabout a pair of pistons 26 which are carried by the peripheral portion of a piston carrier in the form of a disk 28. The pistons are rigidly mounted upon this disk either by a suitable detachable connection or being integrally formed thereon as desired. The disk itself is preferably integrally connected with the shaft 12 as shown in FIGURE 3, although it may be separately formed and rigidly attached thereto if desired.

Annular outwardly projecting ribs or rings 30 and 32, projecting laterally from opposite sides of the disk 28 are provided with suitable sealing means of any desired character whereby to establish a fluid tight seal between this disk and the adjacent walls of the two casing sections 14 and 16 and thus establish a fluid-tight seal between the toroidal working chamber 24, the pistons 26 therein and the cylindrical space lying between the axis of the casing and the toroidal chamber, as will be best apparent from FIGURE 3. Inasmuch as the particular sealing means employed for effecting this fluid-tight seal may be of any suitable construction, and does not in itself constitute a feature of the invention set forth and claimed herein, a further description of the same is deemed to be unnecessary.

As desired, the peripheral portion of the sections of the casing 10 within which is formed the toroidal chamber 24 may be provided with cooling fins such as those indicated at 34. Obviously additional cooling means may be provided if desired, but since the invention is not limited to any particular cooling means, a further description of the same is deemed to be unnecessary.

It will be observed from FIGURES 2 and 3 that the central portion of the casing sections are provided with cylindrical hub portions as shown at 36 in which are received the journals or bearings 38 of the power shaft 12, and radially extending webs as at 40 may extend from these hub portions to the outer periphery of the casing as desired, which webs may constitute stiffening and reinforcing members for the structure of the casing; and may be employed as mounting brackets, if desired, for supporting the engine on any suitable mounting.

Projecting radially outwardly from the casing sections are enlarged bosses as at 42, 44 and 46. The boss 42 is provided with a passage 48 therein which communicates with the interior of the toroidal chamber and constitutes an exhaust passage by which the products of combustion are discharged from the engine, a suitable exhaust pipe as at 50 being secured thereto if desired, as shown in FIGURE 1. The boss 44 is likewise provided with a passage 52 therethrough and constitutes a combustible mixture inlet passage opening into the toroidal chamber and by which combustible mixture is introduced into the engine. For this purpose, as shown best in FIGURE 1, a conventional carburetor 54 is detachably mounted and secured upon this boss for supplying fuel mixture to the engine, it being understood that the mixture is supplied to the carburetor and controlled in accordance with conventional practice.

Housed in and carried by the boss 46 is a transfer valve assembly designated generally by the numeral 56 and whose construction and operation forms an important feature of the invention claimed herein. A further valve assembly indicated generally by the numeral 58 is supported by the bosses 42 and 44 as shown in FIGURE 4 for a purpose to be subsequently apparent.

At this point it should be understood that the two valve assemblies 56 and 58 extend radially through the toroidal chamber 24 as shown in FIGURE 4 to thus constitute partitions or abutments therein, and also to constitute in effect cylinder heads for the continuously rotating pistons.

Any desired conventional ignition system may be provided to effect ignition of the fuel charges of the engine in properly timed relation to rotation of the pistons in their working chambers. Conveniently, a magneto-type ignition system may be employed with the numeral 62 designating generally a magneto suitably operated by the rotation of the power shaft of the engine, which by means of a conductor 64 supplies ignition current to a spark plug 66 which is mounted in the casing 10 in such a manner that it is adapted to initiate combustion of the compressed fuel charges in the engine as set forth hereinafter.

The engine is further provided with a lubricating system of any desired type which conveniently may consist of a lubricant storage tank or reservoir 70 which by means of conduits 72 and 74 delivers lubricant to the journal bearings 38 and through suitable lubricant passages in the power shaft 12 also lubricates the sealing rings provided upon the sealing ribs 30 and if desired 32 of the piston carrier 28. In the arrangement suggested in FIGURE 3, this lubricating system utilizes the effect of centrifugal force to supply lubricant from the axis of rotation radially outwardly thereto to the parts and places where lubricant is required, and lubricant is returned under the influence of gravity through the casing to the lower portion of a sump 76 formed therein from whence the lubricant is returned as by a duct or conduit 78 to the reservoir. It is to be understood, however, that the details of the lubricating system are in no way essential to the invention claimed herein and that the latter is not to be considered as restricted to the specific lubricating system illustrated.

Reference is now made to FIGURES 4 and 5 in conjunction with the diagrammatic views of FIGURES 7–12 for an understanding of the construction and operation of the valve assemblies 56 and 58. Referring first to the transfer valve assembly of FIGURE 6 it is to be now understood that this assembly consists of a pair of semi-cylindrical tapered or frusto-conical shaped valve sleeves. Thus there is provided an outer semi-cylindrical valve member 82 which cooperates with an inner semi-cylindrical valve member 84. At their diametrically enlarged extremities, these valve members are provided with conical semi-circular hubs as at 86 and 88 which are provided with suitable bearing assemblies therebetween and which are further provided with external ring gears as at 90 and 92 respectively as shown best in FIGURES 5 and 6. These ring gears serve to impart the timed rotary movement to the two valve sleeves 82 and 84 from the valve driving means as set forth hereinafter. As will be particularly seen from FIGURE 4, the boss 46 and also the casing portion between the bosses 42 and 44 are provided with a radially extending chamber into which the two valve sleeves of each set 56 and 58 is received having further provided a removable cover plate as at 94 for the chamber of the assembly 56, and a corresponding cover plate 96 for the valve assembly 58. The cover plates are provided with re-entrant portions 100 for each cover which extends down into the hollow interior of the valve sleeves and serves to enclose the upper ends of the latter and especially to enclose the ring gears 90 and 92 thereof. In addition, the re-entrant portion 100 of the cover 94 is provided with the threaded bore 102 for receiving the previously mentioned spark plug which thereby communicates with the open space upon the interior of the two valve sleeves of the valve assembly 56.

The pair of sleeves are provided with cutaway portions each indicated by the numeral 104 of FIGURE 5 which are disposed so that when the sleeves are in proper rotation with respect to each other its opening is just sufficient to permit passage of the piston 26 therethrough as shown in the views of FIGURES 7–12.

As far as described, and referring now to FIGURES 7–12, it will be understood that the rotation of the two valve sleeves by means to be subsequently described will be so timed with respect to each other and with respect to the rotation of the pistons 26 in the toroidal chamber 24, that the pistons will be enabled to pass through these valve sleeves in the following manner.

Figure 7:
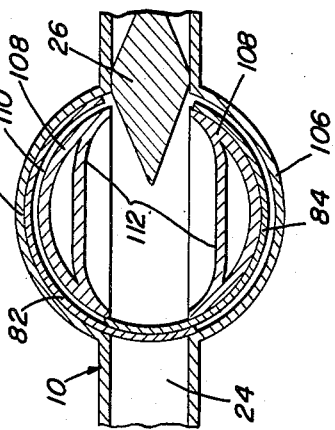

Normally, it will be considered that the pistons rotate in a counter-clockwise direction as viewed in FIGURE 4, with the pistons passing through the valve assemblies in a right to left direction as seen in FIGURES 7–12. As the pistons approach the valve assembly, the valve skirts or sleeves 82 and 84 will be so disposed as to cause their unbroken sides to overlap each other in the position shown in FIGURE 12 so that the advancing piston will compress the charge of combustible mixture ahead of the same as it approaches the valve. Just as the piston reaches the valve, the sleeves rotating continuously in opposite directions and at twice the speed of the pistons will be rotated sufficiently to cause the valves to close on the remote side of their chamber by the overlapping edges of their sleeves with the adjacent sides of the valve opening as shown in FIGURE 7. This permits the piston and the charge compressed ahead of the same to enter the valve chamber. As the piston continues to advance, the valve sleeves continue to rotate so that when the piston is entirely within the chamber, the valve sleeves are closed both in front of and behind the piston as shown in FIGURE 9. Upon further progress of the piston as in FIGURE 10, the valve sleeves open so that the piston may emerge, the valves closing off the chamber to the rear of the piston as in FIGURE 11, until as in FIGURE 12 the piston is completely leaving the valve chamber and the valve is in readiness for the next approaching piston.

It will be observed that the function of the valve sleeves is thus to provide a piston head or abutment against which the gases are compressed as a piston advances, and against which the ignited gases react to impart their thrust to the rear of the piston and thus apply power through the piston to the piston carrier and the power shaft 12.

As so far described, the functions of both of the valve assemblies 56 and 58 are identical, the construction as to these features being the same and their operation being the same.

However, in addition to its function as constituting a cylinder head against which the gas or explosive charge in front of the piston is compressed; has an abutment against which the exploded charge reacts upon the rear of the piston, and as a means to permit piston to pass through the valve assembly during its rotation, the valve assembly 56 also constitutes a transfer means whereby the charge of fuel compressed in front of the piston is transferred to the rear of the piston and then fired to exert a propulsive force upon the piston.

For this purpose, as will be best apparent from FIGURES 7-12, the rotatable pairs of valve sleeves 82 and 84 are each housed within a cylindrical chamber formed in lateral enlargements 106 of the casing sections. Disposed concentric with these enlargements 106 and spaced inwardly from the valve sleeves 82 and 84 therein are a pair of depending walls 108 which are complementary to each other. These walls have cylindrical outer surfaces as at 110 to thus cooperate with the enlargements 106 to provide a cylindrical chamber therebetween in which the valve sleeves 82 and 84 are slidably and movably received. On their adjacent faces, the members 108 are provided with laterally recessed portions 112 which extend radially of the engine and provide on each side of the piston 26 as the latter passes through and on each side of the diameter or width of the working chamber 24 a clearance or by-pass chamber into which the compressed combustible charges are forced and retained as the pistons enter the valve assembly.

Referring again to FIGURES 7-12 it is now to be understood that the compressed charge has now been pressed entirely into the by-pass chambers in FIGURE 7 since the charge is trapped by the closed forward walls of the sleeve valves and is confined by the entry of the piston 26 into the valve chamber. Similarly, in FIGURE 8, the charge is still trapped in these by-pass chambers and likewise in FIGURE 9.

Figure 12:
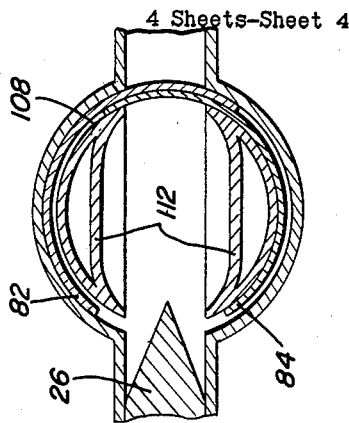
Figure 11:
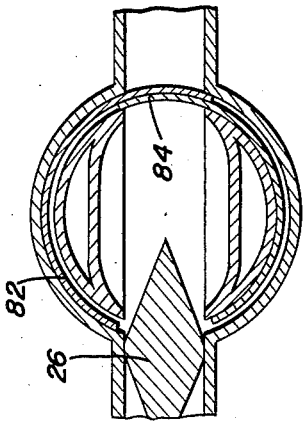
Figure 10:
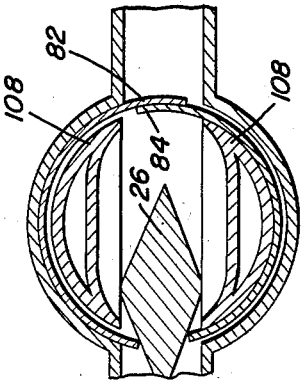

However, as the piston begins to emerge from the left side of the chamber as in FIGURE 10, the charge is now all behind the piston and in the transfer chambers this being the position shown in FIGURE 11 and the spark plug will be timed to fire the charge which will thus explode behind the piston and drive the same forwardly as will be apparent from FIGURE 12. Thus, the transfer chamber 56 serves as a means to effect compression of the charge in advance of a piston; to by-pass this charge to the rear of the piston as the latter passes through the chamber; to fire the charge within the chamber and rearwardly of the piston as the piston is emerging from the chamber; and to constitute a fixed cylinder head or abutment against which the exploded charge expands as the piston travels forwardly beyond the chamber.

The valve assembly 58 serves as a partition and abutment which prevents passage of the combustion products beyond the exhaust port opening 48 as the piston passes the latter. When the piston passes through the valve assembly 58, it starts to compress the charge lying ahead of the same which charge was introduced behind the preceding piston by the intake passage 52 and as the compressing piston passes the intake passage it in turn begins to draw in a charge behind itself to be compressed by the following piston as the latter passes the valve assembly 58.

The valve assemblies 56 and 58 may be identical except that the valve assembly 58 does not require the transfer chamber nor the spark plugs.

In order to impart rotation to the valve sleeves 80 and 82 of the two valve assemblies various driving means of suitable character could be provided. One satisfactory means for this purpose has been illustrated in the accompanying drawings although it is to be understood that the invention is not necessarily restricted to this particular type of valve driving means.

For this purpose there are provided two pairs of suitably mounted valve driving shafts 120 which are shown in dotted lines in FIGURE 4 and which conveniently may extend through suitable shaft housings 122, provided with removable covers 124 as shown in FIGURE 1. These shafts extend from the power shaft 12 into the valve compartment housings of the boss 46 and that lying between the bosses 42 and 44, and upon their outer ends the shafts are provided with driving spur gears 130 which mesh with the ring gears 92 of the hub 88 of the inner valve sleeve 84. A second spur gear on each of the shafts 120 as at 134 is in turn caused to mesh with the other ring gear 90 carried by the hub 86 of the outer sleeve 82.

At their inner ends, the four shafts 120 are again provided with spur gears as at 134 which are continuously in mesh with the annular bevel gears 136 formed on the power shaft 12 on opposite sides of the piston carrier 28 thereof.

It will thus be seen that timed rotation is imparted to the valve sleeves in a properly synchronized manner with respect to the position and travel of the pistons in the toroidal chamber 24.

Inasmuch as the transfer valves rotate at twice the speed of the power shaft, suitable dynamic balancing of the valve bodies, of any suitable character may be employed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rotary piston internal combustion engine comprising a casing having an annular chamber with a piston therein, means causing continuous uni-directional movement of said piston throughout said chamber, first and second hollow abutments dividing said chamber into closed compartments and through which abutments said piston is adapted to pass, said piston, annular chamber and abutments defining cyclic working chambers of an internal combustion engine, said first abutment including a transfer valve assembly including a valve transfer passage extending therethrough in alignment with and constituting a continuation of said annular chamber, said transfer passage being of a length that is not less than that of said piston whereby to completely receive the latter therein, valve members at the opposite ends of said passage operable to alternately open and close the ends of said passage in timed relation to travel of said piston therethrough, said passage being of greater width than said annular chamber whereby to provide space to receive and retain a charge compressed in front of said piston and transfer it to the rear of said piston as the latter moves through said passage, means for introducing a combustible mixture into said annular chamber between said piston and said first abutment, means for igniting said mixture after it has been transferred to the rear of said piston, means for exhausting combustion products from said annular chamber.

2. The combination of claim 1 wherein said transfer passage has chambers at the opposite sides of said piston for holding stationary said compressed charge during travel of said piston through said charge and passage.

3. The combination of claim 1 wherein the front face of said piston is wedge-shaped for dividing and displacing the compressed charge laterally to opposite sides of said piston in said transfer passage.

4. The combination of claim 1 wherein said piston is diamond-shaped with wedge-shaped forward and rear surfaces facilitating flow of the compressed charge in said transfer passage laterally outwardly from in front of the piston and laterally inwardly at the rear of the piston.

5. The combination of claim 1 wherein said transfer valve assembly has said ignition means therein.

6. The combination of claim 1 wherein said transfer passage extends laterally to both sides of said piston and provides clearance into which compressed fuel entering the assembly in front of a piston is moved laterally and is retained stationary at each side thereof and is then transferred to the rear of a piston.

7. In an internal combustion engine, a power shaft journaled for rotation, a stationary casing having an annular chamber disposed concentrically about said shaft, a piston carrier fixed to said shaft and having a pair of pistons fixedly secured thereto and projecting radially therefrom and being received for movement in said chamber, a pair of rotating abutments disposed in and extending transversely across said chamber, each abutment having a chamber therein through which said pistons are adapted to pass, each abutment comprising a valve chamber, a pair of semi-cylindrical valve sleeves mounted in said valve chamber for rotation concentrically and in overlapping relation about an axis which is transverse the casing and shaft, means connected to said pair of sleeves in each valve chamber for effecting rotation of the sleeves in timed relation to rotation of the pistons whereby said sleeves alternate to maintain at least one transverse partition across said chamber and to admit said piston into said valve chamber and through said sleeves, means for introducing a combustible mixture into said chamber for compressing said combustible mixture in advance of a piston by the latter against one of said abutments, means for transferring said compressed charge to the rear of said piston, means for igniting said compressed combustible mixture behind said piston and means adjacent the other abutment for exhausting combustion products from said chamber, the spaces between said abutments are unequal thereby effecting a longer power stroke than the compression stroke.

8. The combination of claim 7 wherein said transfer means comprises transfer chambers on opposite sides of the line of travel of the pistons through the abutment.

9. In an internal combustion engine, a power shaft journaled for rotation, a stationary casing having an annular chamber disposed concentrically about said shaft, a piston carrier fixed to said shaft and having a pair of pistons fixedly secured thereto and projecting radially therefrom and being received for movement in said chamber, a pair of rotating abutments disposed in and extending transversely across said chamber, each abutment having a chamber therein through which said pistons are adapted to pass, each abutment comprising a valve chamber, a pair of semi-cylindrical valve sleeves mounted in said valve chamber for rotation concentrically and in overlapping relation about an axis which is transverse the casing and shaft, means connected to said pair of sleeves in each valve chamber for effecting rotation of the sleeves in timed relation to rotation of the pistons whereby said sleeves alternate to maintain at least one transverse partition across said chamber and to admit said piston into said valve chamber and through said sleeves, means for introducing a combustible mixture into said chamber for compressing said combustible mixture in advance of a piston by the latter against one of said abutments, means for transferring said compressed charge to the rear of said piston, means for igniting said compressed combustible mixture behind said piston and means adjacent the other abutment for exhausting combustion products from said chamber, said pair of sleeves are of sufficient circumferential extent to overlap at their opposite ends to thereby completely confine said piston and said compressed mixture therebetween.

10. In an internal combustion engine, a power shaft journaled for rotation, a stationary casing having an annular chamber disposed concentrically about said shaft, a piston carrier fixed to said shaft and having a pair of pistons fixedly secured thereto and projecting radially therefrom and being received for movement in said chamber, a pair of rotating abutments disposed in and extending transversely across said chamber, each abutment having a chamber therein through which said pistons are adapted to pass, each abutment comprising a valve chamber, a pair of semi-cylindrical valve sleeves mounted in said valve chamber for rotation concentrically and in overlapping relation about an axis which is transverse the casing and shaft, means connected to said pair of sleeves in each valve chamber for effecting rotation of the sleeves in timed relation to rotation of the pistons whereby said sleeves alternate to maintain at least one transverse partition across said chamber and to admit said piston into said valve chamber and through said sleeves, means for introducing a combustible mixture into said chamber for compressing said combustible mixture in advance of a piston by the latter against one of said abutments, means for transferring said compressed charge to the rear of said piston, means for igniting said compressed combustible mixture behind said piston and means adjacent the other abutment for exhausting combustion products from said chamber, each sleeve of said pair of sleeves is provided with an external ring gear, the ring gears of the pair of sleeves lying in a concentric but radially spaced position relative to said casing, gearing connecting the ring gears of said sleeves to said power shaft.

11. In an internal combustion engine, a power shaft journaled for rotation, a stationary casing having an annular chamber disposed concentrically about said shaft, a piston carrier fixed to said shaft and having a pair of pistons fixedly secured thereto and projecting radially therefrom and being received for movement in said chamber, a pair of rotating abutments disposed in and extending transversely across said chamber, each abutment having a chamber therein through which said pistons are adapted to pass, each abutment comprising a valve chamber, a pair of semi-cylindrical valve sleeves mounted in said valve chamber for rotation concentrically and in overlapping relation about an axis which is transverse the casing and shaft, means connected to said pair of sleeves in each valve chamber for effecting rotation of the sleeves in timed relation to rotation of the pistons whereby said sleeves alternate to maintain at least one transverse partition across said chamber and to admit said piston into said valve chamber and through said sleeves, means for introducing a combustible mixture into said chamber for compressing said combustible mixture in advance of a piston by the latter against one of said abutments, means for transferring said compressed charge to the rear of said piston, means for igniting said compressed combustible mixture behind said piston and means adjacent the other abutment for exhausting combustion products from said chamber, said ignition means being in communication with said transfer means.

References Cited in the file of this patent

UNITED STATES PATENTS

| | | |
|---|---|---|
| 858,912 | Rousseau | July 2, 1907 |
| 1,562,299 | Cundy | Nov. 17, 1925 |
| 1,856,839 | Macart | May 3, 1932 |
| 1,970,594 | Brady | Aug. 21, 1934 |
| 2,275,205 | Straub | Mar. 3, 1942 |
| 2,944,533 | Park | July 12, 1960 |

FOREIGN PATENTS

| | | |
|---|---|---|
| 397,352 | Great Britain | Aug. 24, 1933 |
| 594,113 | Great Britain | Nov. 3, 1947 |